US010067548B2

(12) United States Patent
Ragupathi et al.

(10) Patent No.: US 10,067,548 B2
(45) Date of Patent: Sep. 4, 2018

(54) EFFICIENT POWER-ON SEQUENCE FOR A MODULAR INFORMATION HANDLING SYSTEM

(71) Applicant: Dell Products L.P., Round Rock, TX (US)

(72) Inventors: Dinesh Kunnathur Ragupathi, Round Rock, TX (US); Venkatesh Ramamoorthy, Round Rock, TX (US); Arun Muthaiyan, Round Rock, TX (US); Jun Gu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 15/159,575

(22) Filed: May 19, 2016

(65) Prior Publication Data

US 2017/0336841 A1    Nov. 23, 2017

(51) Int. Cl.
| | |
|---|---|
| G06F 1/00 | (2006.01) |
| G06F 1/26 | (2006.01) |
| G06F 9/4401 | (2018.01) |
| G06F 1/32 | (2006.01) |

(52) U.S. Cl.
CPC ............ G06F 1/266 (2013.01); G06F 9/4411 (2013.01); *G06F 1/3215* (2013.01)

(58) Field of Classification Search
CPC ....... G06F 1/266; G06F 9/4411; G06F 1/3215
See application file for complete search history.

(56) References Cited

U.S. PATENT DOCUMENTS

| | | | |
|---|---|---|---|
| 2007/0083774 A1 | 4/2007 | Baurer et al. | |
| 2007/0118771 A1 | 5/2007 | Bolan et al. | |
| 2008/0028238 A1 | 1/2008 | Lucas et al. | |
| 2008/0109893 A1 | 5/2008 | Merkin | |
| 2010/0042852 A1 | 2/2010 | Yin et al. | |
| 2011/0138233 A1 | 6/2011 | Wang | |
| 2013/0268779 A1* | 10/2013 | Hueston | G06F 1/3206 713/300 |
| 2015/0106605 A1 | 4/2015 | Brundidge et al. | |
| 2015/0106608 A1 | 4/2015 | Brundidge et al. | |
| 2016/0124750 A1 | 5/2016 | Liu et al. | |

* cited by examiner

*Primary Examiner* — Xuxing Chen
(74) *Attorney, Agent, or Firm* — Jackson Walker L.L.P.

(57) ABSTRACT

A method for managing an information handling system includes detecting an insertion signal indicating an insertion of a server blade or other another type of modular information handling system or information handling resource into a slot of a blade server chassis. A power-on request that identifies the server blade and the slot in which the server blade was inserted may be received. A blade history table may be searched for an entry matching or otherwise corresponding to the server blade. If the blade history table includes a matching entry, comprising an entry corresponding to the modular information handling system, the chassis management controller may control the power-on sequence for the server blade in accordance with one or more attributes or fields of the matching entry.

18 Claims, 5 Drawing Sheets

EFFICIENT POWER-ON SEQUENCE FOR A MODULAR INFORMATION HANDLING SYSTEM

TECHNICAL FIELD

The present disclosure relates in general to information handling systems, and more particularly to modular information handling system in which two or more similar systems reside in a common chassis and share some resources in common.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A modular IHS, which may also be referred to herein as a blade IHS, a server blade, or more simply, a blade, may be described as a motherboard enclosed in a housing having a form factor suitable for inserting in one, or possibly more, of a plurality of slots defined by a modular system chassis designed to receive a plurality of blades. A blade may be a compute blade, a storage blade or another type of peripheral blade, a hybrid blade including compute and peripheral resources, or another type of blade. The combination of the chassis and any inserted blades may be referred to collectively as a blade enclosure.

The chassis may define two or more rows of slots and two or more slots in each row. A modular system chassis with 2 rows of 10 slots, as an example, may accept as many as 20 single height, single width blades. In at least some embodiments, a chassis may accept double-wide blades, double height blades, or both.

The slots of a modular system chassis may be accessible from a front panel of the chassis and support resources, including power supplies, interconnect resources, thermal fans, and the like, may be accessible from a rear panel. The rear panel may also provide access to one or more chassis-level management controllers, which may be referred to herein as chassis management controllers (CMCs).

Generally, when a blade is inserted into a slot of a chassis, a chassis controller detects the signal and initiates, or causes a blade-level controller to initiate an AC power-on sequence. To facilitate hot coupling of blades, the blade and chassis may be configured such that blade insertion and removal require little force. As an unintended consequence, however, the frequency with which a connected blade may be unintentionally unseated or otherwise disconnected may increase and each such event may produce a subsequent initiation of an AC power-on sequence.

In at least some existing blade server systems, a CMC may process each POWER-ON received from a blade in the same way. As an example, a CMC may determine whether to grant permission by obtaining worst case values of one or more power consumption parameters including, as non-limiting examples, minimum power consumption, average power consumption, and peak power consumption. In turn, the applicable blade may execute code to obtain values for these parameters or estimates of these values. The blade may incorporate power determination or power estimation modules as part of a POST that executes whenever a blade detects a power-on signal.

SUMMARY

In accordance with the teachings of the present disclosure, disadvantages and problems associated with performing a complete-power on sequence following each inadvertent and/or very brief unseating of a hot-pluggable server blade may be reduced or eliminated.

In accordance with embodiments of disclosed subject matter, a method of managing an information handling system, which may be performed by a chassis management controller of a blade server, includes detecting an insertion signal generated when a server blade is inserted into a slot of a blade server chassis. If a power-on request or message identifying the server blade and the corresponding chassis slot is subsequently received, a blade history table (BHT) may be searched for an entry that matches to the blade identified in the request.

If a matching entry is detected, the chassis management controller may control the power-on sequence for the server blade in accordance with one or more attributes of the matching entry. The matching entry may include power data and, in such cases, controlling the power-on sequence may include determining power-on permission in accordance with the power data stored in the BHT.

Power data stored in the BHT may indicate power data determined during a previous boot sequence, e.g., a power data value generated during a power-on self-test (POST) performed as part of a previous execution of system BIOS (basic I/O system). Alternatively, the matching entry may be a STATIC entry in which stored data indicates power consumption data provided by administrator input or estimated based on an algorithm or one or more rules, e.g., determined based on a form factor of the blade.

A STATIC BHT entry may be a ONE TIME STATIC entry, which changes to a dynamic entry upon first completion of BIOS. A STATIC BHT entry may be an ALWAYS STATIC entry that does not change type following one or more successful boot sequences.

Controlling the power-on sequence may include determining power-on permission in accordance with power data stored in the BHT or in accordance with an estimate of power consumption determined based on the applicable form factor. Form factor-based estimates may reflect a worst case estimate, e.g., the highest reasonable estimate of a minimum required power, the highest reasonable estimate of a maximum power consumed, etc. Estimates of power may be used to control the power-on sequence when no matching entry is found in the BHT or when a blade with a matching BHT entry is inserted after expiration of a re-insertion interval. Accordingly, the power-on sequence may be controlled in accordance with a power sequence state determined based on the value of a reinsertion timer indicating time expired since the last removal of a blade, and a reinsertion threshold indicated in the BHT. Controlling the power sequence may include ignoring, based on a value of a ZERO-CHANGE attribute, the power sequence state and, instead, unconditionally determining power consumption based on the power consumption data stored in the BHT.

If no BHT entry matches the inserted blade, the chassis controller may create an entry corresponding to the blade and publish the BHT, including the new entry, to other chassis servers in a chassis server group, which may include all chassis servers connected via a chassis server group interconnect.

Regardless of how power permission is determined, the BHT entry may be updated when the host BIOS executed following a grant of power-on permission completes. In addition to power requirement data, BHT entries may include server identity data, e.g., a MAC (media access control) address, component data indicating selected components, e.g., central processing unit (CPU), memory devices including dual in-line memory modules (DIMMs), network interface cards (NICs), etc., and fabric data indicating interconnect information, e.g. 1/10 Gb Ethernet, 10/40 Gb Ethernet, Fibre Channel, etc. These values may be obtained from a blade level management controller referred to herein as the baseboard management controller (BMC) pre-boot, i.e., before BMC boot completes.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1A, 1B, 2A, 2B, and 3-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

Figure 1A:
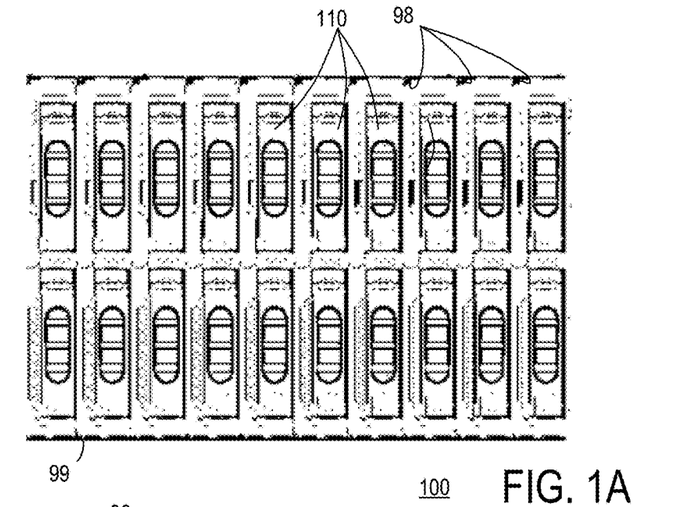
FIG. 1A illustrates a front elevation of a modular information handling system enclosure.

FIG. 1A illustrates a modular, multi-slot, resource sharing IHS 100, referred to herein as chassis IHS 100 or chassis server 100. The chassis server 100 of FIG. 1A includes a physical chassis 99 that includes two or more slots 98, each of which is configured to receive a modular information handling system 110, also referred to herein as a blade 110. Chassis 99 may include a mid-plane (not depicted) to which blades 110 may attach, connect, or otherwise couple. The chassis server 100 may further include one or more shared resources (not depicted) including, as non-limiting examples, shared power supplies, shared network interfaces and interconnects, shared cooling fans, etc., which may connect to the midplane from a rear opening (not depicted) of chassis 99. The midplane may interconnect any two or more of the blades 110 and/or the shared resources.

Blades 110 are generally readily removable from the front face of chassis 99. Blades 110 may be removed or unseated for a variety of reasons, both intended and unintended. Generally, if a blade 110 is unseated such that a discontinuity exists between an edge connector of the blade and its corresponding midplane socket (not depicted), the re-insertion of the blade to re-establish the edge connector to socket connection triggers a reset or power-on signal that initiates a power-on sequence sometimes referred to herein as a blade AC power-on sequence or an AC power-on sequence.

If chassis server 100 is configured to perform the same response to every power-on signal, for example, by treating each power-on signal as an indication of the insertion of a brand new blade 110, chassis server 100 may perform power-on sequence operations that may not be necessary in every circumstance that produces a power-on signal. As one non-limiting example, if a blade 110 is momentarily and accidentally unseated from its midplane connector, the subsequent power-on sequence should not be required to "start from scratch" and determine, for example, what power requirements the blade has and whether the server chassis can accommodate those requirements. Instead, any information about the blade 110 that was previously known might be preserved and re-used when a blade insertion and the corresponding power-on signal occurs under circumstance suggesting that the inserted blade and its characteristics are known to blade server 100.

Various common scenarios may result in an intentional or unintentional power-on signal that is not related to a change in blade or blade hardware that might affect power allocation within the chassis server.

Figure 1B:
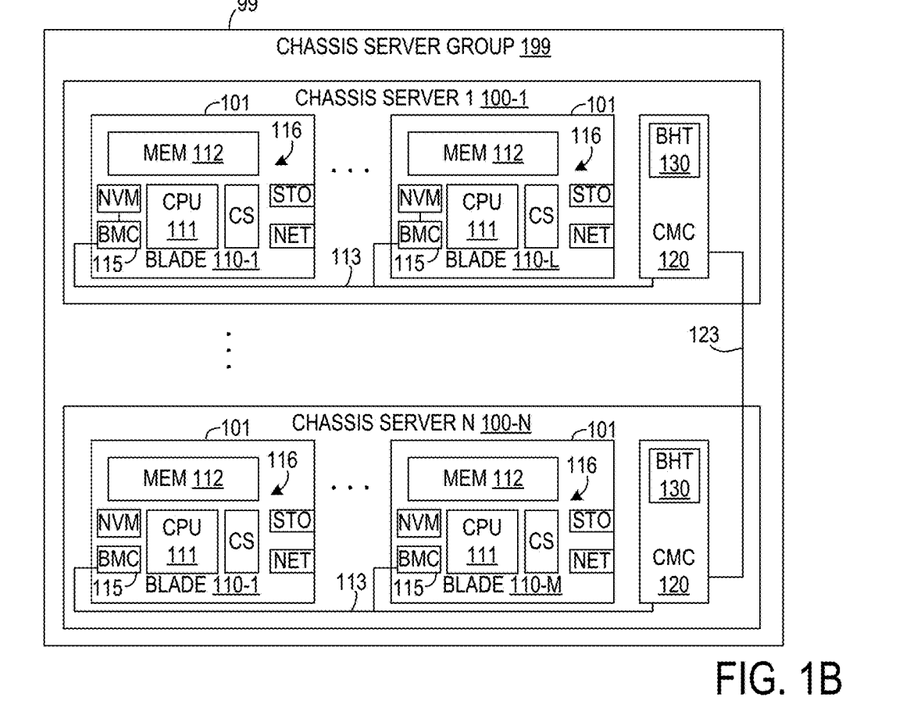
FIG. 1B illustrates a block diagram of a group of enclosures.

FIG. 1B illustrates a block diagram of a chassis server group 199 comprising a group of N interconnected chassis servers 100-1 through 100-N, wherein N is an integer greater than 1. Each chassis server 100 illustrated in FIG. 1B includes a plurality of blades 110. Specifically, chassis server 100-1 includes L blades, 110-1 through 110-L, chassis server 100-N includes M blades, 110-1 through 110-M, and the chassis server 100 illustrated in FIG. 1A includes 20 blades 110.

Each blade 110 illustrated in FIG. 1B includes at least one CPU 111, a main memory 112, and a chip set CS attached to a motherboard 101. CPU 111 may include any device or logic configured to interpret and/or execute program instructions and/or process data, and may include, without limitation a general purpose microprocessor, a microcontroller, a digital signal processor (DSP), an application specific integrated circuit (ASIC), or any other digital or analog circuitry configured to interpret and/or execute program instructions and/or process data. Memory 112 may include operating system (OS) instructions and one or more application program instructions (not depicted) executable by CPU 111, a flash memory or other form of nonvolatile storage device NVM, which may include a POST and/or BIOS modules executable by CPU 111, a chip set CS which may provide a peripheral hub between CPU 111 and one or more peripherals including, as non-limiting examples, a storage interface STO and a network interface NET.

Each blade 110 illustrated in FIG. 1B further includes a baseboard management controller (BMC) 115. In embodiments of a blade 110 that includes a BMC 115, blade resources other than BMC 115 may be referred to collectively as host 116. BMC 115 may represent a service processor resource that includes its own processor (not depicted), runs its own firmware, and otherwise operates independent of the host environment, i.e., the CPU/OS environment. BMC 115 may provide functionality that enables remote monitoring and management of its corresponding blade 110. BMC 115 may communicate with one or more sensors on blade 110 to monitor temperature, cooling fan speeds, power status, operating system (OS) status, and the like. BMC 115 may send alerts to a system administrator via an attached network if any parameters fall out of line.

Each BMC 115 may include a baseline set of processing and communication resources that support a system management interface using Intelligent Management Platform Interface (IPMI) or another suitable system management protocol. Some embodiments may supplement the resources included in BMC 115 to provide more developed system management interfaces. The BMC 115 may, in some embodiments, support the same or substantially the same features as a Dell™ Remote Assistant Card (DRAC) or an integrated Dell™ Remote Access Controller (iDRAC) from Dell, Inc.

FIG. 1B further illustrates a chassis management controller (CMC) 120 in each of the chassis servers 100. Each CMC 120, like each BMC 115, may include its own processor and memory and may execute in its own dedicated environment. As suggested by its name, CMC 120 may support functionality for monitoring the chassis 99 and the dedicated and shared information handling resources contained within.

FIG. 1B depicts each CMC 120 connected to each of the BMCs 115 in the applicable chassis server 100 via a management interconnect 113. The management interconnect 113 may represent any suitable local area network (LAN) interconnect, e.g., Ethernet, Inter Integrated Circuit (I2C), System Management Bus (SMBus), or any other suitable public or proprietary interconnect. FIG. 1B further depicts all of the CMCs 120 in chassis server group 199 coupled via group interconnect 123, which may be implemented with any of the interconnects suitable for management interconnect 113 or with a different interconnect.

CMC 120 may also provide a management console for user/administrator access to these functions. For example, CMC 120 may provide for communication with a user interface, permitting a user to interact with CMC 120 to control and manage components of blade 110. As another example, CMC 120 may act as a proxy and establish communication between two information handling resources by either configuring them to directly couple to each other or transfer information by receiving information from one information handling resource, processing the information if needed, and then transferring the information to the other information handling resource. As a further example, CMC 120 may implement Web Services Management ("WS-MAN") or another suitable management protocol permitting a user to remotely access CMC 120 to configure blade 110 and its various information handling resources.

With respect to power and other shared resources, CMC 120 may be configured as a permission master that treats power-on signals generated when a blade 110 is inserted as requests for permission to power-on. In any of these embodiments, CMC 120 may grant or deny a power-on permission request from a blade 110 when the blade 110 is inserted into a chassis slot 98.

A power-on sequence that requires a host system 116 of a blade 110 to execute its POST and/or BIOS module(s) as a prerequisite to obtaining power-on permission from the CMC is undesirable at least because the POST and BIOS modules and the subsequent resolution of the power determination by CMC 120 can be undesirably time consuming. Anecdotal evidence suggests that this power-on delay may be on the order of minutes and occurs across the spectrum of blade server providers.

This unfortunate aspect of chassis servers is exacerbated by the comparatively frequent number of power-on signals that may be generated within any given chassis. Power-on events occur comparatively frequently in modular resource environments, such as the environments illustrated in FIG. 1A and FIG. 1B, due to at least two factors: the frequency of intended power-on signals and the frequency of inadvertent power-on signals.

The frequency of power-on signals associated with intended acts may be comparatively high due to the relative ease and frequency with which blades 110 may be installed, replaced, or relocated, e.g., whether from one slot 98 to another within a single chassis 99 or from one chassis 99 to another in the same chassis group 199. The frequency of unintended or inadvertent power-on signals may be comparatively high due, again, to the relative ease with which a blade 110 can become unseated from its midplane connector.

The chassis servers 100 illustrated in FIG. 1B address the power-on delay issue, at least in part, by maintaining a data structure referred to herein as a blade history table (BHT) 130. Although FIG. 1B illustrates BHT 130 located in storage (not explicitly depicted) of CMC 120, BHT 130 may be located in any networked location accessible to CMC 120. As described below, a chassis server 100 employing a CMC 120 provisioned with a BHT 130 and supporting modules within CMC 120 within each blade 110 may experience a significant reduction in power-on delay.

Figure 2A:
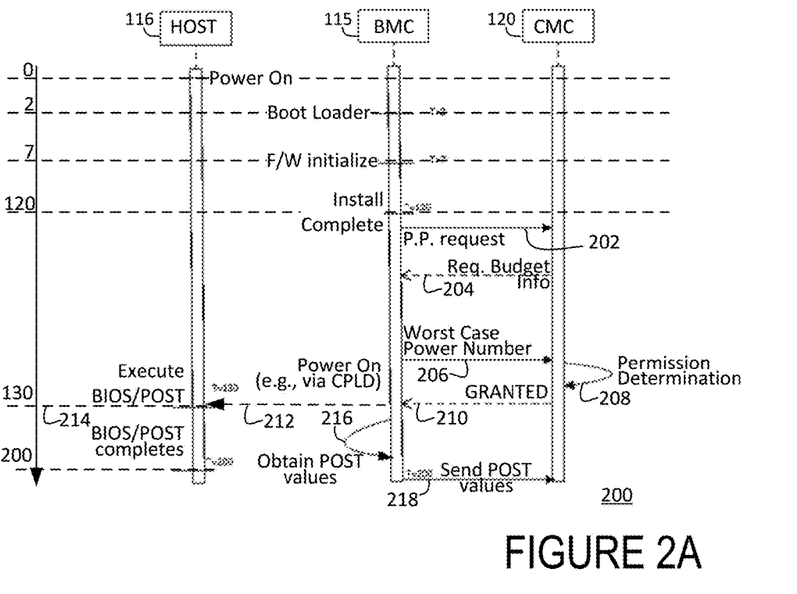
FIG. 2A illustrates a timing diagram for a prior art power-on sequence.
Figure 2B:
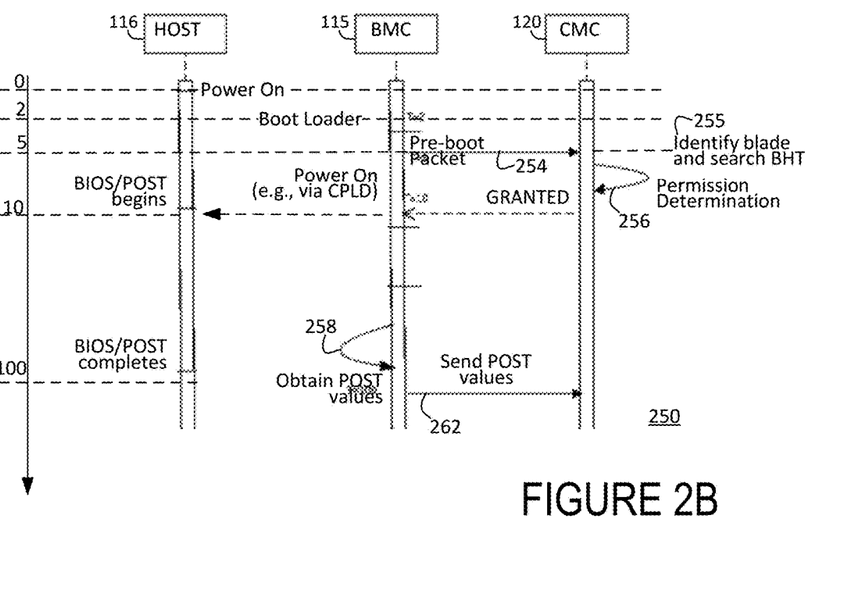
FIG. 2B illustrates a timing diagram for a power-on sequence in accordance with disclosed subject matter.

FIG. 2A and FIG. 2B both illustrate events detected and operations performed by host 116, BMC 115, and CMC 120 during power on sequencing. The operations and events are depicted chronologically as indicated by the vertical axis where T=0 near the top and proceeds downward in the FIGURE as time increases. The values of T shown in FIGS. 2A and 2B are representative values indicated in seconds.

Referring first to FIG. 2A, a legacy power-on sequence 200 is illustrated. The power on sequence 200 of FIG. 2A begins with a power-on event occurring at T=0. The power-on event may correspond to a reset of a CPU or BMC that occurs when AC power is applied to a blade as it is inserted or reseated within a chassis slot. As FIG. 2A illustrates, BMC 115 detects and responds to the power on event by initiating its boot loader at T=2 and its firmware installation at T=2. The firmware installation illustrated in FIG. 2A requires approximately 2 minutes, completing at T=120. At this point, the illustrated BMC 115 sends an explicit power-permission request 202 to CMC 120, at which point, the determination of power permission by CMC 120 begins.

The power-on sequence 200 of FIG. 2A illustrates CMC 120 responding to the power permission request 202 by returning to BMC 115 a request 204 to obtain power budget information. BMC 115 is illustrated responding to power budget information request 204 by returning (206) worst minimum and maximum power data to CMC 120. Once CMC 120 has received the requested power budget information from BMC 115, CMC 120 performs a power permission determination 208 and decides either to grant or deny power-on permission to host 116. The CMC 120 then conveys the result of the power-on determination to BMC 115. As illustrated in FIG. 2A, CMC 120 granted power-on permission and delivered an indication 210 of the determination to BMC 115.

In the power-on sequence illustrated in FIG. 2A, BMC 115 responds to receiving indication 210 granting the power permission request 202 by directly accessing (operation 212) and toggling a complex programmable logic device (CPLD) on host 116 to power-on host 116. FIG. 2A illustrates this toggling of the CPLD at approximately T=130.

Upon receiving power on permission at T=130, host 116 may initiate its power-on sequencing and FIG. 2A illustrates host 116 executing (operation 214) its POST/BIOS modules. The execution of POST/BIOS modules completes at T=200 in the illustrated sequence 200. FIG. 2A further illustrates BMC 115 obtaining (operation 216) POST values from host 116 and forwarding (operation 218) the POST values to CMC 120, which may then affirm its earlier grant of power permission based on the POST values from host 116 and terminate the power on sequence with a successful termination-power granted status. Only at this point may host 116 construct a fabric connection and begin to perform its intended function.

Those of ordinary skill in the field of modular systems will recognize that, when BMC 115 sends the POST-determined power values to the CMC 120 at T=200 in FIG. 2A, the CMC 120 has actual power values, i.e., power values based on execution of the actual host, corresponding to blade 110. The BHT 130 illustrated in FIG. 1B stores this information, as well as information enabling CMC 120 to identify the applicable blade 110 in the future. In this manner, a subsequent power on sequence might beneficially retrieve the power values stored in BHT 130 to accelerate the power on sequence. This leveraging might be employed under circumstances in which it may be relatively safe to assume that the power characteristics and requirements of an inserted blade 110 are most likely the same or similar to the power characteristics and requirements of a blade 110 recorded in BHT 130.

The assumption of no substantial change is most apparent when the blade insertion that triggered a power on signal is known to be the same blade that was most recently operating in the applicable chassis slot. This same blade assumption may be associated with a parameter that is believed to be a reliable predictor of the same blade assumption. An example of such a parameter is the re-insertion interval, i.e., the amount of time elapsing between the removal of a blade from a particular slot and the subsequent insertion of a blade in the same slot. If the re-insertion time is low, there may be valid reasons to suspect that the inserted blade is the same blade that was removed. Whenever, as an example, a blade is inadvertently unseated from its chassis slot, the corresponding re-insertion interval is likely to be low assuming an administrator or other user notices the unseating of the blade when it occurs.

However, even if the reinsertion interval is sufficiently long, i.e., long enough to obtain and insert a different blade, the assumption of no substantial power change may still be valid. If, as an example, an administrator removes a particular blade and either performs no operations on the blade, e.g., visual inspection, or performs operations that would not significantly increase the power consumption of the blade as a whole, e.g., swaps a like-for-like CPU or DIMM, the administrator may wish to manually bypass the legacy power on sequence of FIG. 2A since the administrator knows that the previously determined post values are still applicable to the blade being inserted.

While there may be any number of situations in which it may be useful and safe to use previously determined power values for determining power-on permission when a blade insertion is detected, the method by which the previously determined power values may be used to implement a shorter power-on sequence as depicted in FIG. 2B, may include the maintenance, by CMC 120, of BHT 130 in which CMC 120 may store POST-generated power values and any other information capable or useful for identifying the applicable blade 110.

Referring now to FIG. 2B, a power-on sequence 250 exemplary of a power-on sequence for a blade 110 when inserted within a chassis server 100 that includes a CMC 120 that maintains a BHT 130 is illustrated. The power-on sequence 250 illustrated in FIG. 2B begins, like the power-on sequence of FIG. 2A, at T=0 when a power-on signal is generated at T=0 with the insertion of a blade 110 in a chassis slot. The BMC 115 of FIG. 2B initiates its boot loader at T=2. In the case of power-on sequence 250, however, BMC 115, at T=5, sends (operation 254) a pre-boot packet identifying host 116 to CMC 120. As suggested by its name and by the relative timing, BMC 115 sends the pre-boot packet before completing its boot up sequence.

CMC 120, upon receiving the pre-boot packet, uses the information in the packet, which may include a MAC address of the BMC, the host, or both, an IP address, or other uniquely identifying information indicative of the identity of the blade 110, as a key to search (operation 255) the BHT 130 (not shown in FIG. 2B) for a matching BHT entry, i.e., an entry matching the blade or host identifying information contained in the pre-boot packet.

If CMC 120 locates a matching entry in BHT 130, i.e., a BHT entry corresponding to the BMC 115, blade 110 or host 116, CMC 120 may treat the pre-boot packet as an implicit power permission request and immediately invoke the power permission determination (operation 256) based on the power values stored in the BHT 130 under the assumption that any prerequisites or criteria for using historical power data are satisfied. As discussed previously, one such criteria may be a re-insertion criteria that enables the use of BHT data when the re-insertion interval is sufficiently low. Other suitable criteria may be employed in other embodiments.

Thus, FIG. 2B illustrates CMC 120 granting power-on permission to BMC 115 at T=10. The BMC 115, in turn, powers on host 116, for example, by toggling FPGA/CPLD CMC 120 at T=10. As was the case in the power-on sequence illustrated in FIG. 2A, after host 116 powers on and executes its POST/BIOS, BMC 115 may obtain (operation 258) the POST-generated power values, and provide them to CMC 120 for purposes of updating (operation 262) BHT 130 to include the latest POST-determined power values.

Contrasting the power-on sequences of FIG. 2A and FIG. 2B, the FIG. 2A power-on sequence 200, which does not employ historical blade data, requires roughly 200 seconds following blade insertion before useful work may be performed by blade 110. In contrast, the FIG. 2B power-on sequence 250 is ready to perform useful work at T=100, representing a 50% reduction in the power-on delay. In addition, whereas the power-on sequence 200 of FIG. 2A employs worst-case values to make an initial determination of power-on permission, the power-on sequence 250 of FIG. 2B uses historical/actual power data, maintained in BHT 130, so that the power-on request is more likely to be granted than the power-on request that is evaluated according to worst-case values.

Figure 3:
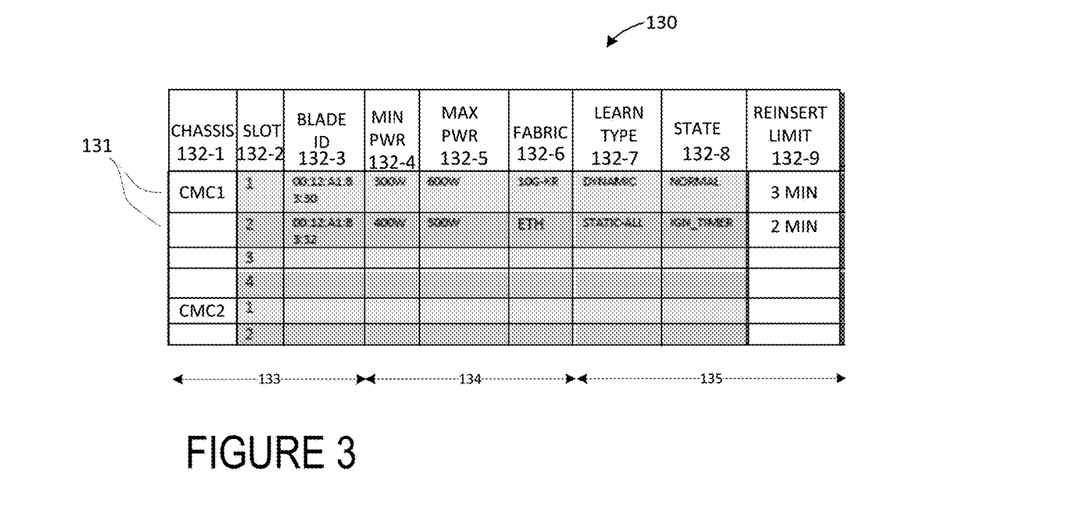
FIG. 3 illustrates an example blade history table.

FIG. 3 illustrates an example BHT 130 suitable for use in reducing the power-on sequence duration when conditions warrant the use of historical power data following a blade insertion. The BHT 130 illustrated in FIG. 3 includes a plurality of entries 131 each of which includes a plurality of attributes 132. In the BHT 130 illustrated in FIG. 3, the attributes 132 include one or more blade identifying attributes 133 that identify a blade and its location, a set of blade attributes 134, and a set of attributes 135 indicating settings, preferences, or power on sequence status/state. Any one or more of the attributes 132 may be used to control the determination of power permission by CMC 120.

The BHT 130 of FIG. 3 includes, within identifying attributes 133, chassis information attribute 132-1, a slot number attribute 132-2, and a blade identity attribute 132-3. Other embodiments of BHT 130 may include more, fewer, or different identifying attributes 133. For example, blade identity might be conveyed by identifying the corresponding BMC 115.

The illustrated BHT 130 includes, within the parametric or characteristic attributes 134, a minimum power attribute 132-4, a maximum power attribute 132-5, and a fabric type attribute 132-6. The fabric type attribute 132-6 may indicate, as examples, whether a blade 110 communicates via a 1/10 Gb Ethernet interconnect, a 10/40 GB Ethernet interconnect, or some other interconnect. The status criteria attributes 135 of FIG. 3 include a type attribute 132-7, a state attribute 132-9, and a reinsertion threshold attribute 132-8.

The state attribute 132-8 may indicate a state of blade 110, and, more particularly, a power-on sequence state that determines, at least in part, whether the corresponding blade 110 is eligible for accelerated boot sequence processing, i.e., eligible for the boot sequence 250 of FIG. 2B.

In an example implementation of the set of available power sequence states, a blade 110 may assume a normal power sequence state, in which accelerated power-on sequence eligibility is determined based upon the reinsertion threshold and the reinsertion interval. The BHT 130 of FIG. 3 further includes a type attribute 132-7 that indicates whether the corresponding blade 110 employees STATIC or DYNAMIC power determination. A DYNAMIC BHT entry may indicate that the CMC 120 always uses the most recent historical POST-determined values of power, i.e., the power values stored in the BHT 130. A STATIC type, in contrast, may indicate that the corresponding blade, while performing the accelerated power-on sequence of FIG. 2B, uses predetermined values, rather than POST-generated values, for making the power-on permission determination. Within the STATIC type, embodiments may include subtypes. For example, a STATIC type may be a STATIC-ALWAYS type or a STATIC-ONCE type. The STATIC-ALWAYS type may indicate that the corresponding blade 110 uses the accelerated power-on sequence processing with the statically provided power values. The STATIC-ONCE type may indicate that the corresponding blade 110 will invoke the accelerated power-on sequence, but only for the next instance of a power-on sequence, after which the applicable blade 110 transitions to DYNAMIC.

In summary, the illustrated BHT 130 includes entries for each previously encountered blade as well as any new blades for which entries at 131 have been manually configured by an administrator prior to the first insertion of such a blade. Blades may be individually identified using various data including, as one example, a Mac address associated with the blade itself or with the blades BMC 115. The historical parametric or performance data stored in BHT 130 may include minimum and maximum power values as well as additional information such as the fabric type of the corresponding blade 110. The fabric type, for example, 10 G, Ethernet, and so forth, may be determinative of accelerated power-on sequence eligibility whenever chassis server 100 requires fabric consistency as a prerequisite to power-on permission. The status and condition attributes 135 may define, in conjunction with a reinsertion threshold, whether a blade 110 is eligible for accelerated power-on sequencing and if so, whether STATIC or dynamic power values will be used to make the power permission determination. In at least one embodiment, the status and condition attributes support a normal state in which dynamic and accelerated power-on sequencing is performed if an insertion is detected within the interval specified by the reinsert threshold attribute following the preceding disconnect. In addition, the status and condition attributes may support one or more bypass states in which accelerated power-on sequencing is performed without regard to the reassertion threshold. The bypass state(s) may be achieved in accordance with user provided inputs, which may be provided via a management control interface, a command line interface, or the like. In any event, regardless of the number and types of states and conditions, accelerated power-on sequencing may be suppressed under certain conditions including, as non-limiting examples, conditions in which a blade inserted is not detected in the historical data, or a situation in which the reinsertion interval exceeds the re-insertion threshold.

In at least one embodiment, the BHT 130 information in each CMC 120 is shared with the other CMCs 120 so that power-on sequence information and historical data is maintained and made public on a group wide basis. In any such embodiments, the relocation of a blade 110 from one chassis server 100 to another chassis server 100 within the same information handling system group 199 may be recognized during power-on sequencing so that, when the blade 110 powers on in its new chassis server 100, the blade 110 qualifies for accelerated power-on sequencing and employs its most recent POST-determined values for the determination.

Figure 4:
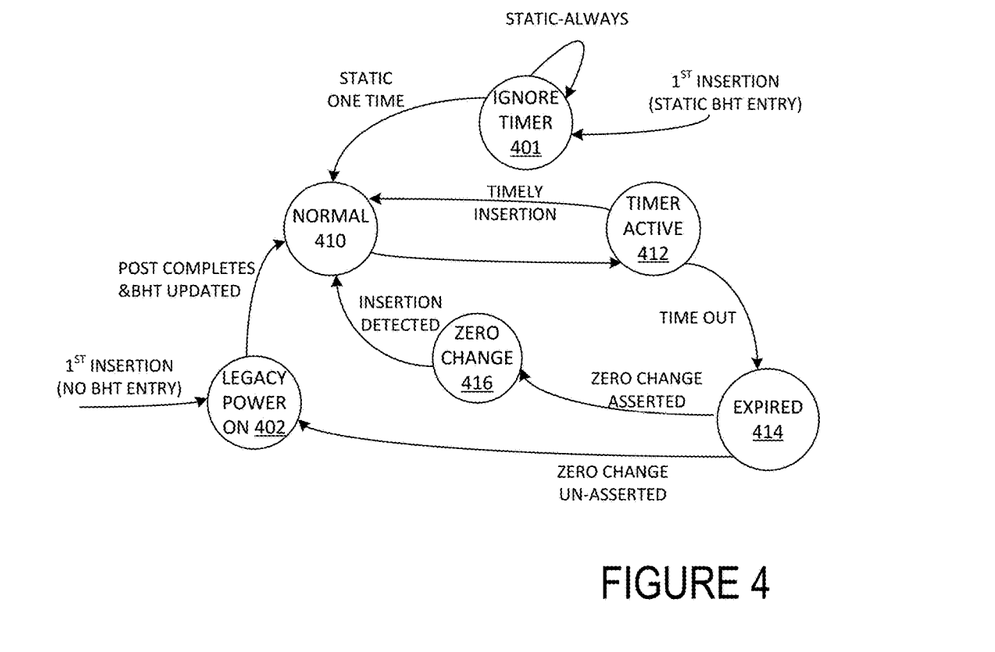
FIG. 4 illustrates a state diagram for a chassis management controller.

FIG. 4 illustrates a state diagram representing various power on sequence states that embodiments of chassis server 100 may assume during operation. The indicated states influence whether accelerated power-on sequencing is performed.

The first time a blade is inserted, the system enters IGNORE TIMER state 401 if the blade is inserted with a STATIC entry already present in BHT 130. The system enters LEGACY POWER ON state 402 if the blade is inserted without a STATIC entry present in BHT 130.

With respect to IGNORE TIMER state 401, if the STATIC entry in table BHT 130 is a STATIC-ALWAYS type, the system will loop indefinitely on IGNORE TIME state 401. If, however, the STATIC type is a STATIC-ONCE type, the system will transition from IGNORE TIMER state 401 to NORMAL state 410 after the first completion of its power-on sequence.

For the blade inserted for the first time with no entry in BHT 130, the system will perform the legacy or power-on sequence represented by the power-on sequence 200 illustrated in FIG. 2A and then transition unconditionally to the NORMAL state 410.

In NORMAL state 410, the system will transition to a TIMER ACTIVE state 412 upon detecting a blade removal. As suggested by its name, the TIMER ACTIVE state 412 is associated with the initiation, by CMC 120 or another resource in chassis server 100, of a timer. The system remains in TIMER ACTIVE state 412 until a subsequent blade insertion is detected. In at least some embodiments, CMC 120 maintains insertion detection data for each individual slot 98 (FIG. 1).

In these embodiments, the system may also maintain a timer dedicated to each slot. Other embodiments may employ a single insertion removal detection apparatus and a single corresponding insertion/deletion timer under the assumption that in most circumstances, no more than one blade insertion/removal is in progress.

The state diagram illustrated in FIG. 4 indicates that the system remains in TIMER ACTIVE state 412 until a blade insertion is detected at which point the system transitions back to NORMAL state 410 if the blade insertion occurred within the interval specified by the insertion threshold. If the blade insertion occurred after the insertion interval indicated by the insertion threshold expires, the system illustrated in FIG. 4 transitions from TIME ACTIVE state 412 to EXPIRED state 414. From the EXPIRED state 414, the illustrated system transitions to the LEGACY POWER ON state 402 unless legacy power-on is bypassed in accordance with a setting. In the illustrated system, bypass of the legacy power-on sequence is achieved with the ZERO-CHANGE state 416 to which the system transitions from TIMER EXPIRED state 414 when a ZERO-CHANGE attribute of the applicable BHT entry has been asserted or set to a particular value. From the ZERO CHANGE state 416, the illustrated system transitions unconditionally to NORMAL state 410 when a blade insertion is detected.

Figure 5A:
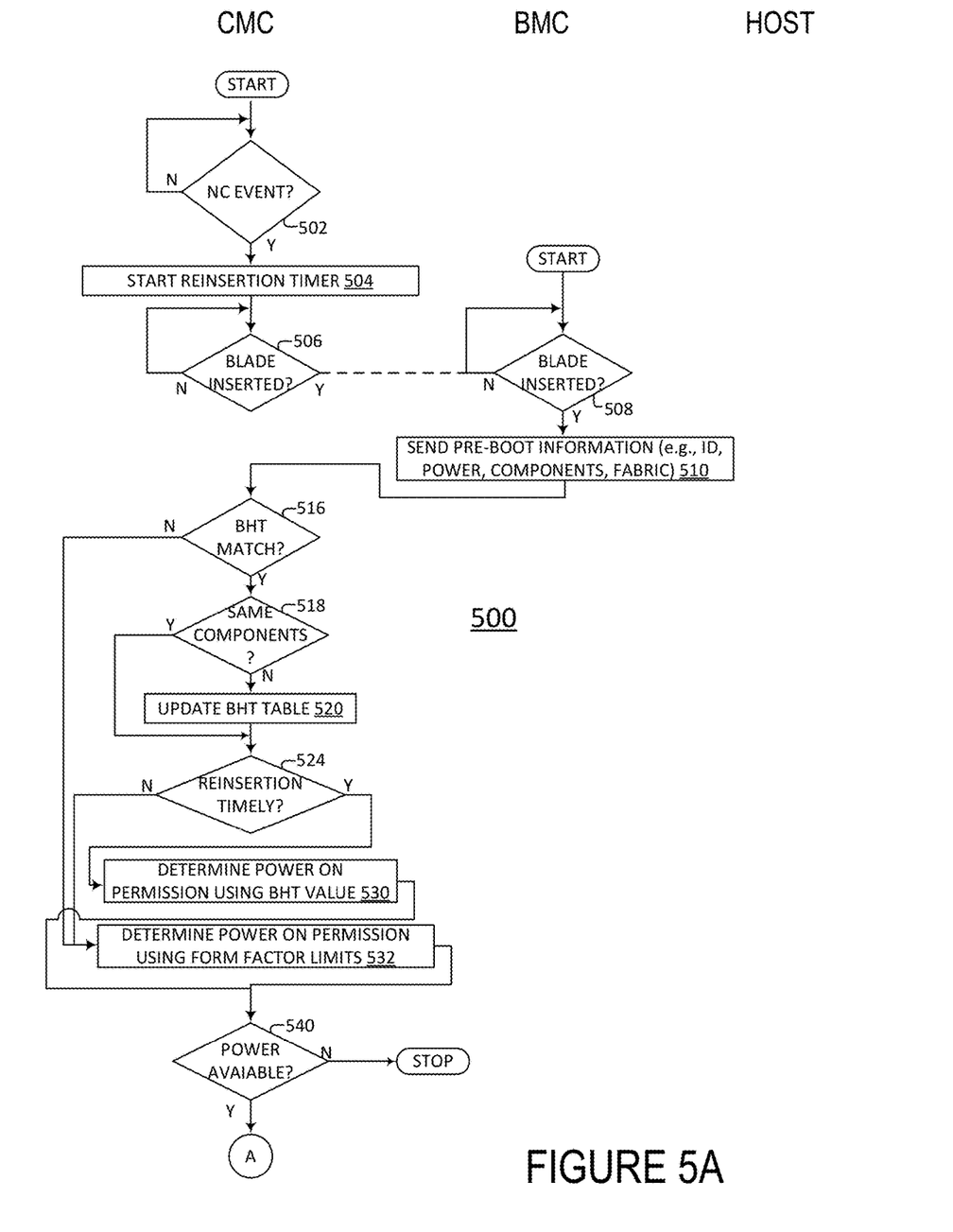
FIG. 5A and FIG. 5B illustrate a flow diagram of a power-on sequence control method.
Figure 5B:
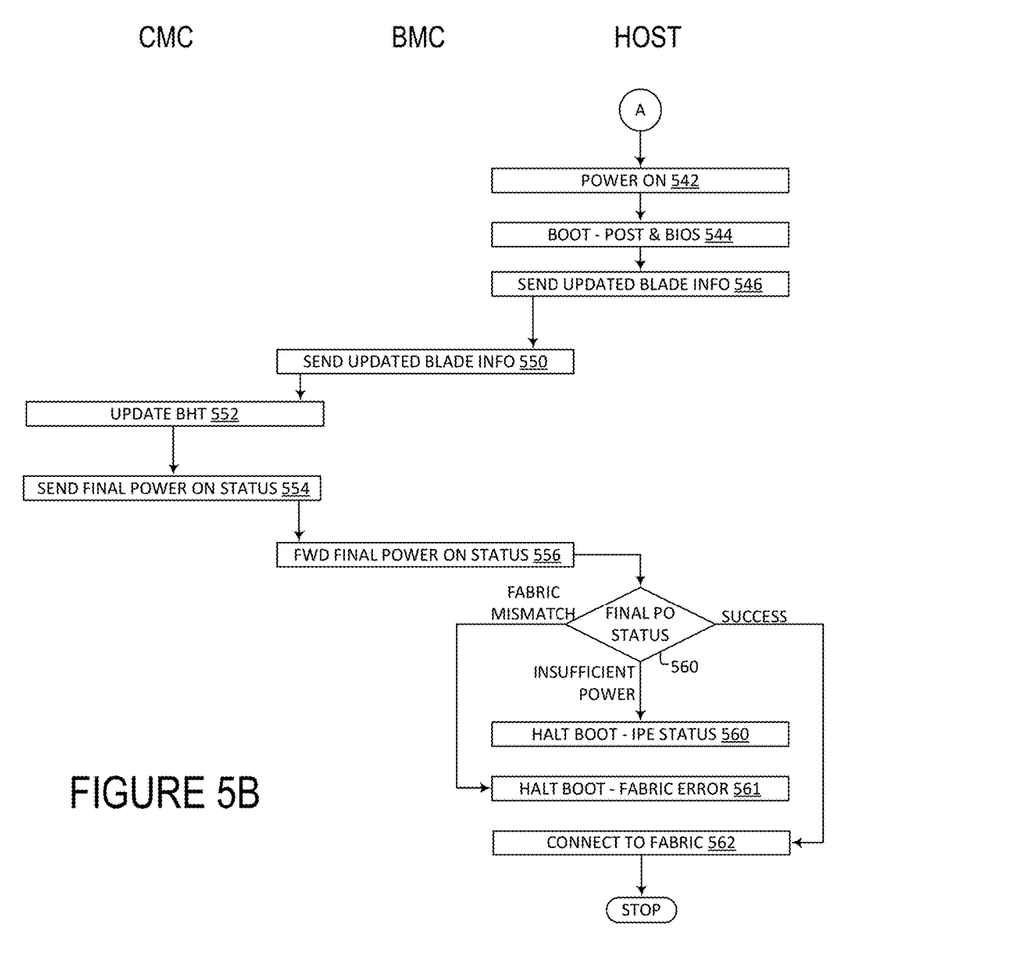

FIG. 5A and FIG. 5B illustrate a flow diagram of a power-on process 500. The illustrated power-on process includes operations that may be performed by different resources including a CMC, represented by operations positioned on the left side of FIG. 5, a BMC, represented by operations positioned in the middle portion of FIG. 5, and a host, e.g., CPU/chipset represented by operations on the right side of FIG. 5.

The illustrated process begin with the CMC monitoring (operation 502) for any type of interruption in an electrical connection between a blade and the chassis. Whether associated with an intended and full removal of a blade from its slot or an inadvertent and temporary unseating of the blade that results in one or more edge connectors of the blade becoming electrically disconnected from corresponding connection elements of the slot, the interruption may be referred to herein as a no connect (NC) event.

The CMC may maintain separate NC event detectors for every slot. Alternatively, if the available data suggests that the simultaneous occurrence of two or more disconnects is sufficiently rare, the CMC may be implemented with a lesser number of NC event detectors and a corresponding lesser number of reinsertion timers, using just a single NC event detector and a single corresponding reinsertion timer. The NC event detector itself may comprise any suitable circuit for detecting a loss of continuity between any one or more of the blade's edge connectors and the corresponding connection element of the slot.

Whenever an NC event is detected, the power-on process illustrated in FIG. 5 starts (operation 504) the reinsertion time associated with the slot that reports the NC event. With the applicable reinsertion timer running, process 500 then monitors (operation 506) the applicable slot for a blade connect (BC) event that occurs whenever a blade is next inserted (operation 508) into the slot.

In the power-on process 500 of FIG. 5, the BC event coincides with the powering on of the blade's BMC and the initiation of a BMC boot program that begins with a BMC diagnostic module, referred to as u-boot, analogous to the power-on self-test module within BIOS. The BMC illustrated in FIG. 5 participates in a reduced-delay power-on sequence by sending (operation 510) blade information to the CMC as part of the u-boot module, i.e., before the BMC boot sequence executes or before the BMC boot sequence. In these embodiments the blade information that the BMC sends may be referred to as pre-boot information.

The pre-boot information may include a media access control (MAC) address that uniquely identifies the BMC, power consumption data, e.g., power consumption data derived during a previous execution of POST, and component information, e.g., CPU identifiers, DIMM or other memory component identifiers, chip set identifiers, and interconnect identifiers, e.g., Fibre Channel, 1/10 Gb Ethernet, 10/40 Gb Ethernet, etc. Component identifiers may serve in determining whether an inserted blade is the same blade, has the same components as the disconnected blade, and if not, whether the inserted blade is likely to require more, less, or roughly the same power as the disconnected blade.

In the power-on process 500 of FIG. 5, the CMC determines (operation 516) whether the BHT includes an entry corresponding to the BMC associated with the pre boot information. If the BHT contains an entry corresponding to the inserted blade, as indicated by the blade's MAC address and/or other identifying information, the process 500 of FIG. 5 determines (operation 518) whether BMC has been changed or modified, e.g., by replacing a CPU, adding or removing a DIMM, etc. If the pre-boot information indicates that the components of the inserted blade differ from the components of the detached blade, the CMC updates (operation 520) the BHT to reflect the information provided by the BMC.

As depicted in FIG. 5, regardless of whether the CMC detected a different component configuration in operation 518, process 500 includes determining (operation 524), in conjunction with the reinsertion timer, whether the insertion of the inserted blade occurred within a particular interval of the prior blade removal.

If reinsertion occurs within the reinsertion interval, the process 500 of FIG. 5 performs (operation 530) a power-on permission determination using power data values stored in the matching entry of the BHT.

If, on the other hand, the reinsertion occurs too late, e.g., after the reinsertion timer exceeds the reinsertion threshold, the power-on determination may be made (operation 532) using limit values determined based on the applicable form factor. Form factor limit values may represent conservative or highly conservative estimates, for a particular form factor of any one or more power parameters including, as examples, minimum power required, average power consumption, maximum power consumption, etc. Form factor limit values may also be used when the inserted blade does not match (operation 516) to any entry in the BHT.

The process 500 of FIG. 5 continues with the CMC determining (operation 540) whether the power available from the chassis is sufficient to provide the requested power. Process 500 terminates with no further action if the chassis power available is insufficient to supply the requested power.

If sufficient power from the chassis is available, the host may then power-on (operation 542) and execute (operation 544) a boot including BIOS and POST before sending (546) updated blade information, including updated power values, interconnect information, and component information to the BMC. The BMC forwards (550) the updated blade information to the CMC. The CMC updates (552) the BHT to reflect the updated power data and fabric data from the host before sending (operation 554) a final power-on response to the BMC. The BMC forwards (operation 556) the final power-on response to the host BIOS.

The host then sets up (operation 562) the actual fabric connection if the power-on response status (operation 560) is SUCCESS. If the chassis does not have sufficient power, the host halts the boot sequence and terminates with an insufficient power error (IPE) power-on response status. If the chassis has sufficient power, but a fabric mismatch is detected, system boot may halt (operation 561) with a system power-on response status of FE (fabric error).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of managing an information handling system, the method comprising:
   detecting an insertion signal indicative of an insertion of a modular information handling system into a slot of a chassis;
   receiving a power-on request including information identifying:
      the modular information handling system; and
      the slot;
   searching a blade history table for an entry corresponding to the modular information handling system;
   locating a matching entry comprising a blade history table entry corresponding to the modular information handling system wherein the matching entry includes power data indicative of power consumption associated with the modular information handling system; and
   controlling a power-on sequence of the modular information handling system in accordance with the power data of the matching entry, wherein controlling the power-on sequence comprises determining power-on permission in accordance with the power data.

2. The method of claim 1, wherein the power data comprises power data generated by the modular information handling system during a previous power-on sequence.

3. The method of claim 1, wherein the power data comprises STATIC power data comprising either:
manual power data input by an administrator; or
default power data determined according to a form factor of the modular information handling system.

4. The method of claim 1, wherein controlling the power-on sequence comprises:
identifying a power sequence state of the modular information handling system; and
determining power-on permission in accordance with the power data and the power sequence state.

5. The method of claim 4, wherein the power sequence state is determined in accordance with:
a reinsertion threshold indicated in the matching entry; and
a reinsertion timer indicative of time expired since a most recent removal of a modular information handling system from the slot.

6. The method of claim 1, wherein controlling the power-on sequence comprises:
responsive to detecting a zero-change parameter in a particular state, unconditionally determining power-on permission in accordance with the power data.

7. The method of claim 1, further comprising:
responsive to not detecting a matching entry, creating a new entry in the blade history table, wherein the new entry corresponds to the modular information handling system.

8. The method of claim 7, further comprising:
recording power data in the new entry following boot up of the modular information handling system.

9. A chassis management controller, comprising:
a processor; and
a memory including processor executable instructions that, when executed by the processor, cause the processor to perform operations comprising:
detecting an insertion signal indicative of an insertion of a blade into a slot of a chassis;
receiving a power-on request including information indicative of:
the blade; and
the slot;
searching a blade history table for an entry corresponding to a modular information handling system;
locating a matching entry comprising a blade history table entry corresponding to the modular information handling system wherein the matching entry includes power data indicative of power consumption associated with the modular information handling system; and
controlling a power-on sequence of the modular information handling system in accordance with the power data of the matching entry, wherein controlling the power-on sequence comprises determining power-on permission in accordance with the power data.

10. The chassis management controller of claim 9, wherein the power data comprises POST-determined power consumption values generated by the blade during a previous power-on sequence.

11. The chassis management controller of claim 9, wherein the power data comprises worst case power data determined according to a form factor of the blade.

12. The chassis management controller of claim 9, wherein controlling the power-on sequence comprises:
identifying a power sequence state of the blade; and
determining power-on permission in accordance with the power sequence state, wherein the power sequence state is selected from:
normal, in which case the power data in the blade history table is used for the power on permission determination; and
timer expired, in which case default data is used for the power on permission determination.

13. The chassis management controller of claim 12, wherein the power sequence state is determined in accordance with:
a reinsertion threshold indicated in the matching entry; and
a reinsertion timer indicative of time expired since a most recent removal of a blade from the slot.

14. The chassis management controller of claim 9, wherein controlling the power-on sequence comprises:
responsive to a detecting a zero change parameter in a particular state, unconditionally determining power-on permission in accordance with the power data.

15. The chassis management controller of claim 9, wherein the operations include:
responsive to not detecting a matching entry, creating an entry corresponding to the blade; and
updating the matching entry following completion of a power-on self-test.

16. A blade server, comprising:
a blade server chassis defining a plurality of slots for receiving server blades; and
a chassis management controller comprising:
a processor; and
a memory including processor executable instructions that, when executed by the processor, cause the processor to perform operations comprising:
detecting an insertion signal indicative of an insertion of a server blade into a particular slot of the plurality of slots;
receiving a power-on request including information indicative of:
the server blade; and
the slot;
searching a blade history table for an entry corresponding to the server blade;
responsive to locating a matching entry comprising a blade history table entry corresponding to the server blade, controlling a power-on sequence of the server blade in accordance with an attribute conveyed by the matching entry, wherein the matching entry includes power data for the server blade and wherein controlling the power-on sequence comprises determining power-on permission in accordance with the power data;
updating the matching entry following completion of a power-on self-test; and
after completing said updating, providing the blade history table to other blade servers within a blade server group, wherein the blade history table comprises a group blade history table common to each of the blade servers.

17. The blade server of claim 16, wherein the power data comprises POST-determined power consumption values generated by the server blade during a previous power-on sequence.

18. The blade server of claim 16, wherein the power data comprises power consumption data associated with a form factor of the server blade.

\* \* \* \* \*